United States Patent [19]

Gilmore

[11] 3,857,242
[45] Dec. 31, 1974

[54] GRAVITY-BUOYANCY MOTOR

[76] Inventor: Ralph W. Gilmore, P.O. Box 426, Brundidge, Ala. 36010

[22] Filed: Mar. 25, 1974

[21] Appl. No.: 454,456

[52] U.S. Cl. ................................................. 60/495
[51] Int. Cl. ............................ F01k 7/00, F03g 7/00
[58] Field of Search .............. 60/495, 496, 497, 504

[56] References Cited
UNITED STATES PATENTS
2,037,973   4/1936   Grondahl .............................. 60/496
3,292,365   12/1966  McCoin ............................ 60/497 X FOREIGN PATENTS OR APPLICATIONS
844,803   5/1939   France ................................. 60/496

Primary Examiner—Martin P. Schwadron
Assistant Examiner—H. Burks, Sr.
Attorney, Agent, or Firm—Watson, Cole, Grindle & Watson

[57] ABSTRACT

A motor operating under the principles of both gravity and buoyancy comprises a vertically disposed conveyor having brackets thereon for the reception of hollow, closed tanks moved onto each bracket from the upper portion of the conveyor. As the tanks fall under their own weight, the conveyor rotates a power output shaft connected thereto. Each tank is moved off their brackets when reaching a lower portion of the conveyor, after which they are each moved into the bottom of a liquid filled receptacle having a vertically disposed conveyor located therein. The tanks are directed beneath brackets on this conveyor and, as the tanks are buoyed upwardly by the liquid, the conveyor rotates another power output shaft connected thereto. Both power output shafts may be interconnected for combining the total power output of both the gravity and buoyancy portions of the motor.

9 Claims, 4 Drawing Figures

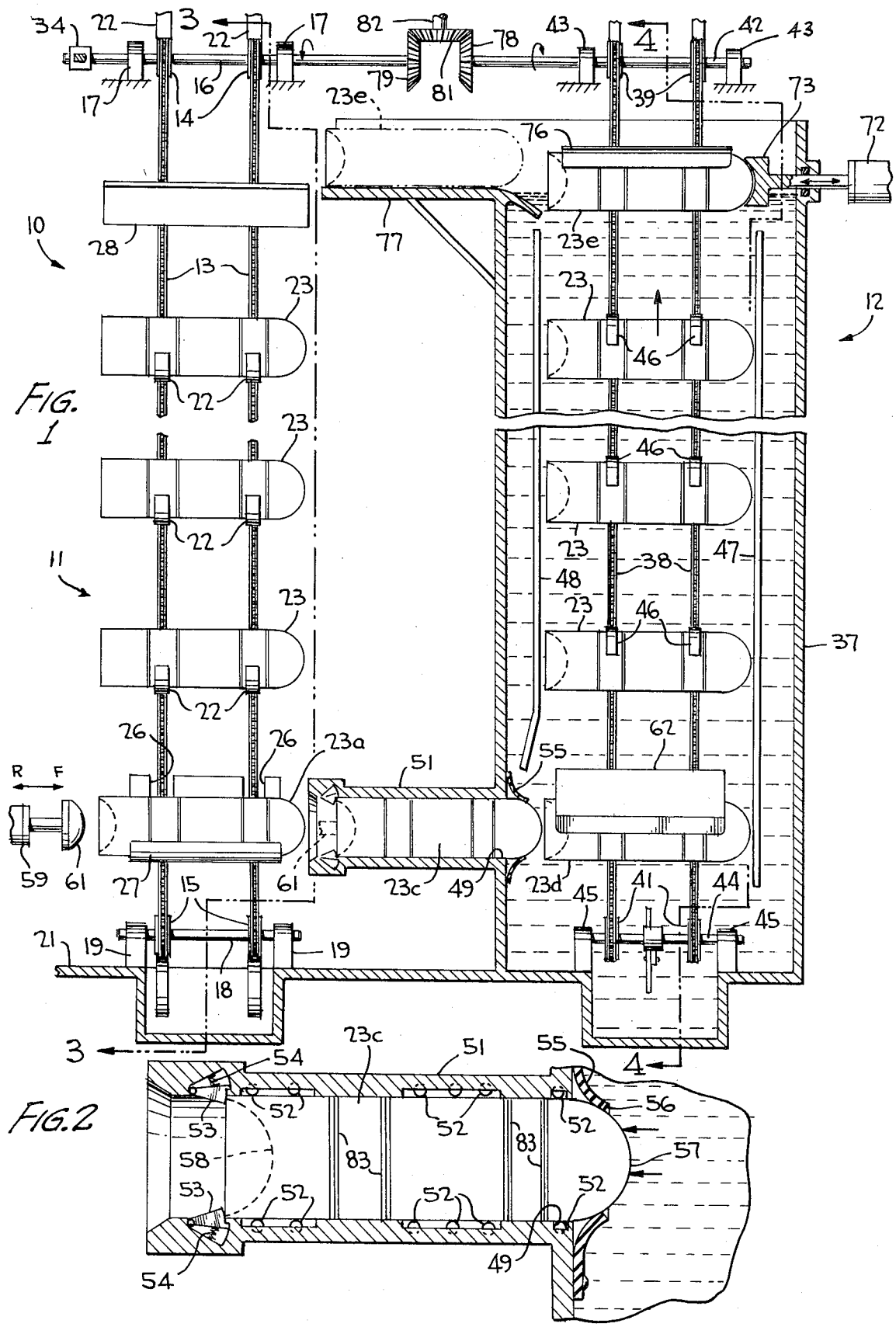

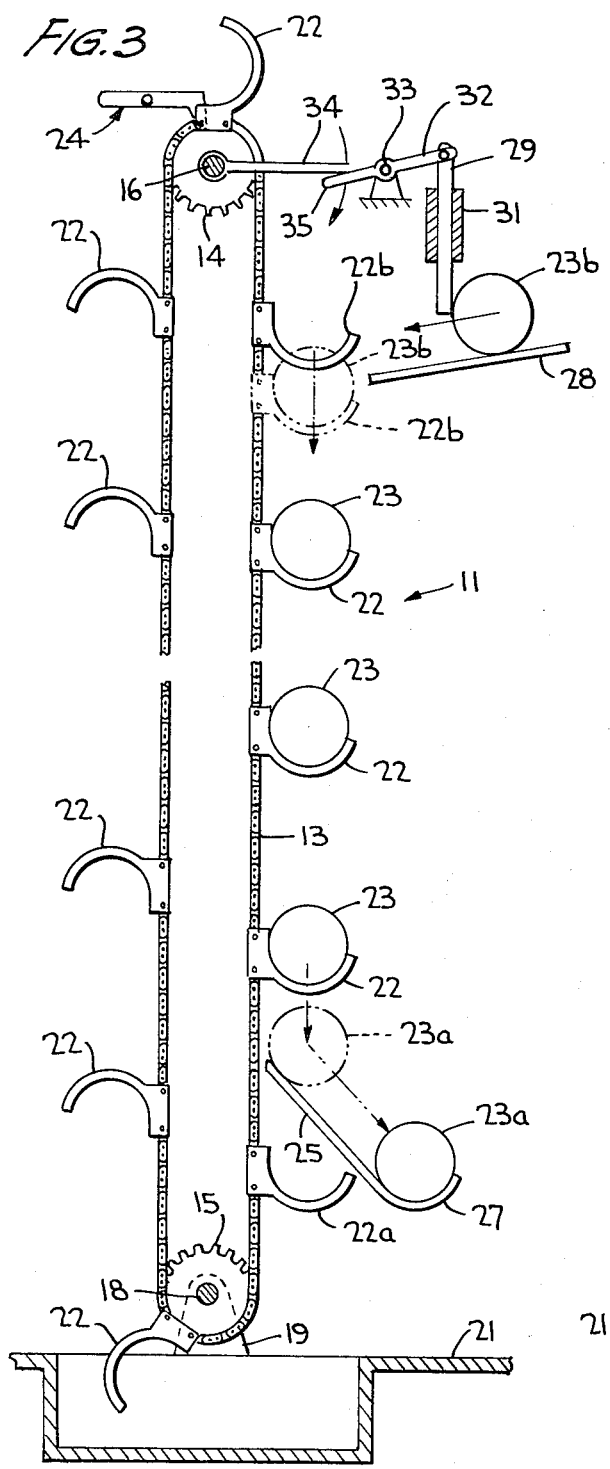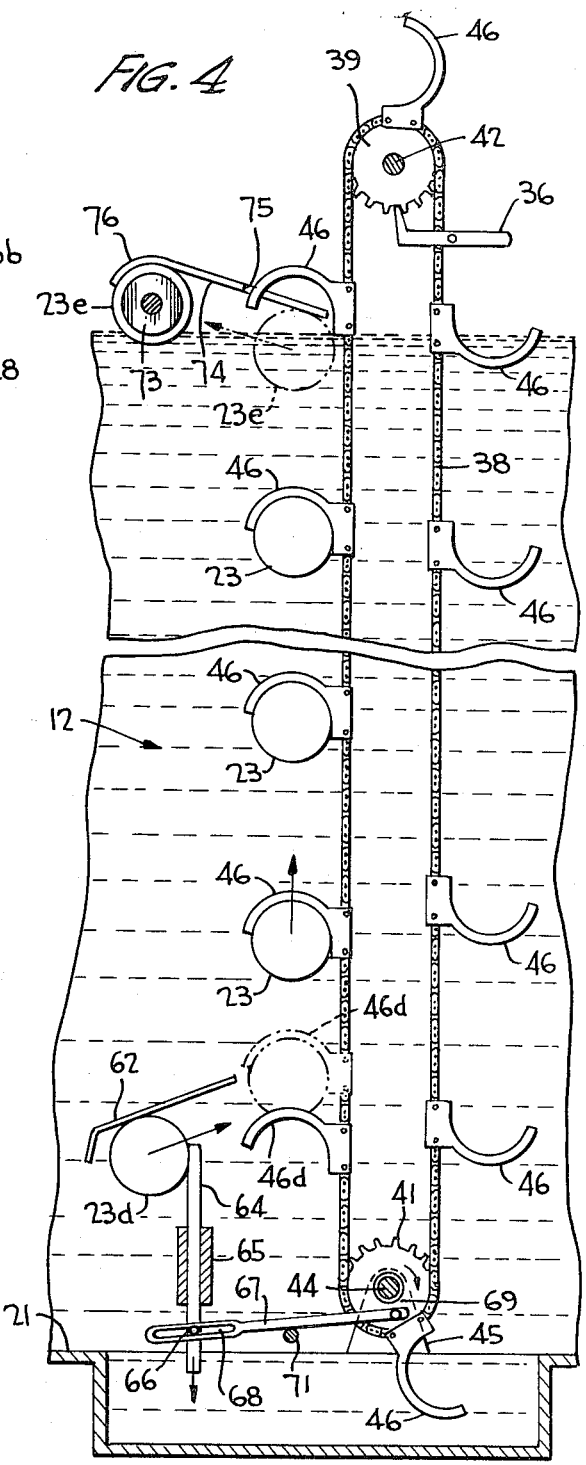

GRAVITY-BUOYANCY MOTOR

This invention relates generally to a motor operating under the principles of both gravity and buoyancy, and more particularly to such a motor wherein a plurality of hollow, closed tanks effect movement of conveyors for both the gravity and buoyancy portions of the motor and, consequently, cause rotation of power output shafts respectively connected to the conveyors.

The gravitational forces associated with falling bodies can, if properly harnessed, generate power as by the turning of a shaft. likewise, the buoyancy forces attendant to buoyant objects in a liquid can, when harnessed, produce power by the turning of a shaft. Therefore, should these falling bodies be used also as buoyed-up objects, a closed power-generating system can be produced by coupling together the aforementioned rotating shafts. A unique power generator may therefore be formed with the only power input being that required for shifting the bodies and objects between the gravity and buoyancy portions of the motor.

It is therefore an object of the present invention to provide a motor or power generator effectively utilizing the forces of both gravity and buoyancy in a closed system with the use of hollow and closed tanks to effect movement of a pair of conveyors by both gravity and buoyancy, power input means being provided for the intermittent shifting of tanks between the gravity side and the buoyancy side of the motor, and vice versa.

Another object of this invention is to provide such a motor wherein the tanks are shiftd one-at-a-time through an opening near the bottom of a liquid filled receptacle having a conveyor mounted for movement therein. Downwardly open bracket arms are spaced along the conveyor beneath which the tanks are guided whereupon, as the tanks are buoyed upwardly, the conveyor turns an output shaft connected thereto. Each tank is reemoved near the top of this conveyor and is directed onto upwardly open bracket arms of another conveyor to thereby cause movement of that conveyor as the tanks fall by gravity under their own weight. Another output shaft is rotated by this moving conveyor, and the tanks are removed from the gravity conveyor and are shifted back into the bottom of the liquid receptacle.

A further object of this invention is to provide such a motor wherein power operated rams are used for shifting of the tanks between the gravity and buoyancy sides of the motor, and guide plates and stop means are used for effecting a one-at-a-time placement of the tanks on the brackets of both conveyors.

Other objects, advantages and novel features of the invention will become more apparent from the following detailed description of the invention when taken in conjunction with the accompanying drawings wherein:

FIG. 1 is a front elevational view of the power generating apparatus of the invention with the liquid receptacle and other support portions of the apparatus being shown in section;

FIG. 2 is a slightly enlarged sectional view of the guide means of FIG. 1 provided for each tank as they are moved inwardly of the liquid receptacle near the bottom portion thereof;

FIG. 3 is a side elevational view of the gravity portion of the apparatus taken along the line 3—3 of FIG. 1; and FIG. 4 is a side elevational view of the buoyancy portion of the apparatus taken along the line 4—4 of FIG. 1.

Turning now to the drawings wherein like reference characters refer to like and corresponding parts throughout the several views, the power generating apparatus or motor of the invention is generally designated 10 in FIG. 1 and comprises a gravity portion 11 as well as a buoyancy portion 12. The gravity portion comprises a vertically disposed conveyor belt including endless chains 13 disposed about upper and lower sprocket wheels 14 and 15. Upper sprocket wheels 14 are each mounted on an output shaft 16 for rotation therewith, this shaft being rotatably mounted within suitable bearings 17. Likewise, lower sprocket wheels 15 are mounted on a shaft 18 for rotation therewith, and this shaft is rotatably mounted within its bearings 19 located on a bottom plate structure 21 of the gravity portion.

A plurality of bracket arms 22 are mounted at evenly spaced intervals on each conveyor chain 13. As seen in FIG. 3, each bracket arm 22 is concavely shaped in an upwardly facing direction for those right hand sides of conveyor chains 13. Pairs of these bracket arms are mounted on the chains in spaced horizontal planes for the reception of closed and hollow, cylindrical tanks 23.

The tanks shown in FIGS. 1 and 3 carried by their brackets cause downward movement of these brackets and a corresponding movement of conveyor chains 13 in a clockwise direction of FIG. 3. These tanks are loaded onto their respective brackets before operation of the gravity portion of the present motor is initiated. Clockwise movement of chains 13 is prevented before the initial start by means of a suitable stop means 25 or the like which engages the teeth of sprocket wheels 14. Obviously, any other stop means may be used for a similar purpose. Upon the release of such stop, chains 13 will commence clockwise movement as tanks 23 are lowered under the force of gravity.

A downwardly and outwardly extending ramp 25 is suitably mounted in place near the lower portion of the conveyor. As seen in FIG. 1, this ramp is provided with space slots 26 to permit each pair of brackets 22 to pass beyond the ramp during clockwise movement of the coonveyor. As brackets 22 are lowered to a position just above ramp 25, further lower movement causes a tank 23 seated on such pair of brackets to be interrupted by ramp 25 and thereby removed from its brackets. Such tank therefore rolls downwardly along the ramp until it comes to rest at the curved end 27 thereof. A tank 23a is shown in FIGS. 1 and 3 as supported at the curved end 27 of ramp 25. This tank 23a is moved off the curved end, as to be more fully hereinafter described, after which other tanks are similarly moved onto ramp 25 in succession as the conveyor moves clockwise. The emptied brackets 22 are shown on the left side of the FIG. 3 conveyor as they continue their movement along with a conveyor.

Another ramp 28 is shown near the top of the conveyor extending inwardly and sloping downwardly for the loading of each tank 23 in succession onto the brackets. FIG. 3 shows a tank 23b positioned on ramp 28 by means of an arresting rod element 29 which prevents tank 23b from rolling in the direction of its arrow. This rod 29 is mounted for vertical movement within a fixed sleeve 31, and is pivotally connected at its upper end to a rocket arm 32. This arm is pivotally mounted between its ends as at 33. An actuating rod 34 is fixedly mounted on shaft 16 for rotation therewith so that, upon clockwise rotation thereof beyond the position shown in FIG. 3, rod 34 moves free end 35 of arm 32 downwardly thereby causing rod element 29 to shift upwardly within its sleeve. Tank 23b is therefore permitted to roll in the direction of its arrow so as to be seated on brackets 22b as they move downwardly to their position shown in phantom outline just below ramp 28.

Buoyancy portion 12 of the present invention comprises a fluid-tight receptacle containing water or a similar liquid. Another vertically disposed conveyor is provided as comprising spaced chains 38 located substantially beneath the water level of the receptacle and extending about upper sprocket wheels 39 and lower sprocket wheels 41. These upper sprockets are fixedly mounted on an output shaft 42 for rotation therewith, which shaft is rotatably mounted within suitable bearings 43. Likewise, lower sprocket wheels 41 are mounted on a shaft 44 for rotation therewith, and this shaft is mounted for rotation within its bearings 45. Bracket arms 46 similar to bracket arms 22 are mounted on conveyor chains 38 at evenly spaced intervals therealong. These brackets are mounted in pairs in the same horizontal plane as similarly described for brackets 22. However, brackets 46 are concavely shaped in a downwardly open direction as shown at the left side of conveyor chains 38. The brackets are sized and arcuately shaped to snugly accommodate tanks 23 therebeneath as shown in FIG. 4.

Forward and aft vertical guide strips 47 and 48 are mounted within the receptacle between opposite walls thereof. Also, a circular opening 49 is provided in a wall of receptacle 37 near the bottom thereof in such a position that its central axis lies outwardly of chains 38 and in a plane perpendicular thereto. A cylindrical sleeve 51 surrounds opening 49 outwardly of the receptacle, the sleeve having an inner diameter slightly in excess of the outer diameter of each tank 23. Antifriction bearings 52 are suitably provided at the inner wall of sleeve 51 so as to facilitate easy sliding movement of each tank therethrough. Also, cam stops 53 are provided near the rearward end of the sleeve and project inwardly thereof. These stops are biassed inwardly by means of springs 54. An annular gasket 55 is provided inwardly of opening 49 within the receptacle, the gasket having a central opening 56 smaller than the outer diameter of each tank.

As can be seen, each of the tanks 23 used in the present apparatus is of identical size and shape, and each has a convex nose portion 57 and a concave tail portion 58 as shown in FIG. 2. Sequential movement of each tank between gravity portion 11 and buoyancy portion 12 is effected by means of a reciprocating ram 59 having a convex ram head 61. The ram may be a power cylinder of the hydraulic, electric or similar type designed for reciprocal movement of head 61 in the direction of the arrows of FIG. 1 operable from a suitable source (not shown). The ram is axially aligned with tank 23a as supported at the curved end 27 of ramp 25. Actuation of ram head 61 in the direction F pushes tank 23a forwardly into sleeve 51 thereby compressing springs 54 as their cam stops are moved outwardly. Ram 61 is moved forwardly to such an extent as shown in phantom outine in FIG. 1 that tank 23a (illustrated as tank 23c already in the sleeve) is pushed beyond cam stops 53 so that they are permitted to spring inwardly and to thereby engage the rearward end of the tank in the sleeve (see FIG. 2). Tank 23c, which was already located within sleeve 51, is thereupon pushed outwardly of the sleeve and into receptacle 37 through its bottom opening 49.

Several tanks 23 are already within the receptacle in place beneath their respective brackets 46 so as to effect clockwise rotation of conveyor chains 38 as these tanks are buoyed upwardly within the liquid. Therefore, the tank which is pushed completely into the receptacle, shown as 23d in FIGS. 1 and 4, is intended to be placed beneath bracket 46d as it moves upwardly during clockwise movement of chains 38. An inwardly directed and upwardly inclined ramp 62 is designed as a tank guide for such purpose. This ramp is suitably mounted within the receptacle so that tank 23d may be positioned therebeneath in the manner shown in FIG. 4 when it enters the receptacle. It is shortly maintained in such position by an arresting rod element 64 mounted for vertical sliding movement within a stationary sleeve 65. Rod 64 is pin connected as at 66 to an actuating road 67 through an elongated slot 68 thereof. Rod 67 is connected by means of a cam link 69 thereof. Rod 67 is connected by means of a cam link 69 to shaft 44. Also, rod 67 is supported between its ends on a pivot pin 71 mounted within the receptacle. Accordingly, rocker arm 67 is made to pivot about pin 71 to effect upward and downward vertical movement of rod element 64 as shaft 44 rotates along with clockwise movement of conveyor chains 38. Downward shifting of rod element 64 will therefore permit tank 23d to roll upwardly along ramp 62 in the direction of its arrow of FIG. 4 until it seats itself beneath brackets 46d, as shown in phantom outline in this Figure.

Another ram designated 72 in FIG. 1 is provided for moving tanks 23 in sequence from buoyancy portion 12 to gravity portion 11 of the apparatus. This ram, powered hydraulically or electrically from a source (not shown), reciprocates its ram head 73 fore and aft in the direction of its arrows of FIG. 1. Unlike ram head 61, this ram head has a concave end for engagement with convex nose 57 of each tank.

As each tank is moved into the receptacle, they are buoyed upwardly beneath brackets 46 so as to effect clockwise movement of conveyor chains 38. The tanks are guided within the receptacle by guide strips 47 and 48 until they each reach an upper ramp 74. As shown in phantom outline in FIG. 4, tank 23e abuts against the underside of ramp 74 during its upward movement as its bracket pairs move upwardly beyond ramp 74. A pair of slots 75 are provided in this ramp for such purpose, only one such slot being shown in FIG. 4. As the brackets 46 clear ramp 74 for tank 23e, the tank is permitted to roll upwardly and outwardly beneath ramp 74 until it comes to rest at downwardly curved end 76 thereof. Ram 72, which is in axial alignment with tank 23e as it rests beneath curved end 76, is then actuated to push the tank outwardly of receptacle 37 onto a ledge 77 connected thereto.

Bevel gears 78 and 79 respectively located on output shafts 42 and 16 intermesh with a common bevel gear 81 located on a main output shaft 82. The main output of the apparatus therefore couples together the outputs of both the gravity and buoyancy portions of the present apparatus. Of course, the independent output of shaft 16 or of shaft 42 may be used if desired.

In operation, a number of tanks 23 may first be stored on ramp 28 as are needed to load each of the brackets 22 lying between ramps 28 and 25 on the right legs of chains 13. Such loading may be carried out by, for example, manually depressing free end 35 of rocker arm 32 so as to permit the tanks to roll one-at-a-time onto brackets 22. Also, each of the brakets on the left leg of chains 38 lying between ramps 74 and 62 may then be loaded with tanks 23 thereunder. Such loading could be carried out by moving tanks one-at-a-time into receptacle 37 beneath these brackets by means of a controlled actuation of ram 59.

Upon the release of stop means 24 and 36, tanks 23 loaded on brackets 22 as aforedescribed will be allowed to fall under their own weight to thereby move conveyor chains 13 clockwise. The arresting means comprising elements 29 to 34 are so synchronized with movement of conveyor chains 13 and the spacing of brackets 22 so as to allow tank 23b to roll along ramp 28 as brackets 22b reach their position shown in phantom outline in FIG. 3. Now that this bracket is loaded, conveyor chains 13 move at substantially the same rate since tank 23a will have been unloaded from its bracket 22a as it meets with ramp 25. Ram 59 is then actuated to cause its ram head 61 to move tank 23a from curved end 27 into sleeve 51. This ramming action is a reciprocating and continuous one carried out for each tank brought to rest at curved end 27 as they are lowered one-at-a-time onto brackets 22 as aforedescribed. With one complete revolution of output shaft 16, rod element 29 is raised vertically to permit a tank to roll into place onto a pair of brackets 22.

It should be pointed out that, initially, a tank is located within sleeve 51 as well as supported at free end 27 while a tank such as 23d is supported beneath ramp 62 within the receptacle. Thereafter, and during continued operation of the present apparatus, actuation of ram 59 moves tank such as 23a into sleeve 51 and, by reason of the nose-to-tail engagement between tanks, causes a tank such as 23c to be moved into receptacle 37 to lie beneath ramp 62. Such actuation initially takes place after stop means 36 is released and empty brackets 46d are made to elevate to their position shown in phantom outline in FIG. 4 by reason of the upward buoyancy movement of the tanks within the receptacle. During the process of such movement of tanks into the bottom of receptacle 37, the tank such as 23c is moved sufficiently into the receptacle so as to push tank 23d fully beneath ramp 62. Then, by reason of the pressure head within the receptacle, tank 23c is forced slightly outwardly of the receptacle as shown by the arrows in FIG. 2. Such rearward movement of the tank is stopped as its rearward portion abuts against cam stops 53 which now extend into sleeve 51. Gasket 55 substantially prevents any leakage around 23c, and forwardly sloping rings 83 on each tank likewise act as as seals to prevent leakage between the tank and sleeve 51.

With each revolution of shaft 44, arresting rod element 61 is shifted sufficiently downwardly to permit tank 23d to roll upwardly along the bottom of ramp 62 until it is seated beneath bracket pair 46d as shown in phantom outline in FIG. 4. As in the gravity side of the present apparatus, the arresting means for this buoyancy portion is synchronized with the brackets in such manner that bracket pair 46d will be in the position shown in phantom outline in FIG. 4 at the time rod 64 is lowered to permit tank 23d to roll toward it. The spacing of the bracket pairs on conveyor chains 38 must also be taken into account to insure the proper location of brackets such as 46d at the phantom outline position for the purpose aforedescribed.

As a tank is loaded beneath bracket pair 46, a corresponding tank such as 23e is unloaded therefrom near the top of the conveyor chains, so that a constant and continuous clockwise rotation of the conveyor chains is assured. Tanks such as 23e are unloaded from their respective bracket pair as brackets 46 pass upwardly beyond ramp 74 through slots 75 thereof. The tank 23e then bears against the underside of ramp 74 and, by reason of its upward slope, rolls therealong until it is seated beneath curved end 76 thereof. Ram 72 is then actuated to extend its ram head 73 a sufficient distance to move tank 23e away from receptacle 37 and onto shelf 77. As can be seen in FIG. 1, this shelf is horizontally aligned with the top of ramp 28 so that movement of another tank by ram head 73 from beneath curved end 76 and onto the shelf causes the tank already on the shelf to be pushed onto the top portion of ramp 28. Once the tanks reach ramp 28, they are arrested by elements 29 and thereafter released to fall toward a bracket pair 22 and to be loaded thereon so as to continue the cycle of operation in the manner as set forth above.

It should be noted that arresting rod elements 29 and 64 described herein represent one of a spaced pair of such elements to be used for effectively arresting the tanks on and beneath their respective ramps 28 and 62. Also, stop means 24 and 36 are actually one of a pair of that shown so as to respectively engage sprocket wheels 14 and 39.

From the foregoing it can be seen that an apparatus has been devised using both the principles of gravity and buoyancy to effect a power output with no fossil fuel or other combustion needed. The motor apparatus of the invention is clean and efficient yet highly effective in providing a significant power output-to-power input multiple.

Obviously, many modifications and variations of the present invention are made possible in the light of the above teachings. It is therefore to be understood that within the scope of the appended claims the invention may be practiced otherwise than as specifically described.

What is claimed is:

1. A gravity-buoyancy motor comprising: a fluid-filled receptacle; a first vertically disposed conveyor mounted within said receptacle, said conveyor having downwardly open bracket arms mounted thereon at vertically spaced intervals; a first means for moving a plurality of closed and hollow tanks one-at-a-time through an opening near the bottom of said receptacle so as to place said tanks beneath said brackets; a first output shaft connected to said conveyor for rotation therewith as said tanks are buoyed upwardly as each are placed beneath said brackets; a second vertically disposed conveyor having upwardly open bracket arms mounted theron at vertically spaced intervals; a second means for moving said tanks one-at-a-time from the upper portion of said receptacle onto each of said second conveyor bracket arms; said first moving means being so disposed as to move said tanks away from said second conveyor at the lower portion thereof and through said opening as said tanks are lowered by gravity from the top of said bottom portion of said second conveyor; a second output shaft connected to said second conveyor for rotation therewith as said tanks are so lowered by gravity; and a power output means interconnecting said first and said second output shafts.

2. The motor according to claim 1 wherein said first moving means comprises a power ram having a convexly shaped piston head for contacting engagement with an end of each said tank of concave shape, and wherein said second moving means comprises a power ram having a piston head of concave shape for contacting engagement with an opposite end of each said tank of convex shape.

3. The motor according to claim 2 wherein tank guide means are provided at the opening near the bottom of said receptacle, said guide means including a sleeve having stop means at the inner surface thereof for preventing outward movement of the tanks during the process of being moved into said receptacle through said opening.

4. The motor according to claim 3 wherein said sleeve inner surface is provided with roller bearings to facilitate easier movement of said tanks therethrough.

5. The motor according to claim 1 wherein a guide plate is mounted within said receptacle adjacent said opening for guiding each tank toward said downwardly open brackets. 41

6. The motor according to claim 5 wherein stop means are provided within said receptacle and are operatively connected with said first conveyor for intermittently stopping each tank on said guide plate and thereafter allowing each tank to proceed one-at-a-time beneath said downwardly open brackets.

7. The motor according to claim 1 wherein a guide plate is mounted adjacent said second conveyor for guiding the tanks onto said upwardly open brackets.

8. The motor according to claim 7 wherein stop means are mounted adjacent said guide plate and are operatively connected with said second conveyor for intermittently stoppiing each tank on said guide plate and thereafter allowing each tank to proceed one-at-a-time onto said upwardly open brackets.

9. The motor according to claim 1 wherein means are provided near the bottom of said second conveyor and near the top of said first conveyor for respectively removing said tanks from said conveyors as said upwardly open and said downwardly open brackets respectively pass beyond said removal means.

* * * * *